US010986077B2

(12) United States Patent
Thiel

(10) Patent No.: US 10,986,077 B2
(45) Date of Patent: *Apr. 20, 2021

(54) SECURE REGISTRATION AND IGNITION OF NETWORK NODES ON A MULTI-HOP WIRELESS NETWORK

(71) Applicant: Facebook, Inc., Menlo Park, CA (US)

(72) Inventor: David Thiel, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,222

(22) Filed: Feb. 11, 2020

(65) Prior Publication Data

US 2020/0186508 A1 Jun. 11, 2020

Related U.S. Application Data

(63) Continuation of application No. 16/399,518, filed on Apr. 30, 2019, now Pat. No. 10,601,797, which is a continuation of application No. 15/394,384, filed on Dec. 29, 2016, now Pat. No. 10,320,762.

(51) Int. Cl.

| | |
|---|---|
| ***H04L 29/06*** | (2006.01) |
| ***H04L 9/14*** | (2006.01) |
| ***H04L 9/30*** | (2006.01) |
| ***H04L 9/32*** | (2006.01) |
| ***H04W 12/08*** | (2021.01) |
| ***H04W 84/18*** | (2009.01) |
| ***H04W 60/04*** | (2009.01) |
| *H04W 60/00* | (2009.01) |

(52) U.S. Cl.

CPC ................ *H04L 63/06* (2013.01); *H04L 9/14* (2013.01); *H04L 9/30* (2013.01); *H04L 9/32* (2013.01); *H04L 63/123* (2013.01); *H04W 12/08* (2013.01); *H04W 60/04* (2013.01); *H04W 84/18* (2013.01); *H04L 63/0442* (2013.01); *H04L 2209/80* (2013.01); *H04W 60/00* (2013.01)

(58) Field of Classification Search

CPC ............... H04L 12/185; H04L 65/1073; H04L 65/1069; H04L 67/16; H04L 67/1065; H04L 67/327; H04W 84/18; H04W 12/06; H04W 12/08; H04W 40/246; H04W 40/24; H04W 48/16; H04W 72/048; H04W 48/08; H04W 76/10; H04M 3/4228; Y02D 70/142; Y02D 70/22; G06F 11/1425; G06F 11/2046; H04N 21/42684

See application file for complete search history.

(56) References Cited

U.S. PATENT DOCUMENTS

2008/0132206 A1* 6/2008 Suzuki ................ H04L 63/0823
455/411

* cited by examiner

*Primary Examiner* — Brian F Shaw
(74) *Attorney, Agent, or Firm* — Baker Botts L.L.P.

(57) ABSTRACT

In one embodiment, a network node of a multi-hop wireless network may receive, from a network management system associated with the multi-hop wireless network, a request for identifying information associated with the network node. The network node may then send, responsive to the request for identifying information, to the network management system, registration information associated with the network node, wherein the registration information includes cipher text encoded with a public key, wherein the encoded cipher text is configured to be decoded with a private key, and wherein the encoded cipher text includes a MAC address and an identifier assigned to the network node.

20 Claims, 5 Drawing Sheets

400

SECURE REGISTRATION AND IGNITION OF NETWORK NODES ON A MULTI-HOP WIRELESS NETWORK

PRIORITY

This application is a continuation under 35 U.S.C. § 120 of U.S. patent application Ser. No. 16/399,518, filed 30 Apr. 2019, which is a continuation under 35 U.S.C. § 120 of U.S. patent application Ser. No. 15/394,384, filed 29 Dec. 2016, issued as U.S. Pat. No. 10,320,762, on 11 Jun. 2019, each of which is incorporated herein by reference.

TECHNICAL FIELD

This disclosure generally relates to wireless communication networks.

BACKGROUND

A multi-hop wireless network may facilitate the communication of data where wired communication is unavailable, impractical, or impossible. For example, a multi-hop wireless network may serve as a wireless backhaul network connecting a core or backbone network to one or more customer networks. A customer network may include customer equipment (CE)—such as Wi-Fi access points (APs), cellular base stations (such as femtocells), and related equipment or other CE—providing wireless or wired connectivity to one or more client devices. A client device may be a desktop or laptop computer, tablet, mobile telephone, appliance, or other client device.

A multi-hop wireless network may include multiple wirelessly interconnected network nodes. A wireless connection between two network nodes may be a hop, and data may be communicated wirelessly through the network from one edge to another along one or more network paths traversing series of network nodes and hops. All or some of the network nodes may be at fixed locations. For example, all or some of the network nodes may be affixed to street lamps, utility poles, other street furniture, or building exteriors. All or some of the network nodes may act as distribution nodes (DNs) or customer nodes (CNs). A DN may wirelessly communicate with CNs or other DNs to relay data through the network. One or more DNs may also communicate with one or more edge devices of a core or backbone network to connect the multi-hop wireless network to the core or backbone network. A CN may communicate with DNs and CEs to connect a customer network to the multi-hop wireless network.

SUMMARY OF PARTICULAR EMBODIMENTS

In particular embodiments, a network node may join the multi-hop wireless network in a secure manner. A label comprising a matrix barcode (e.g., QR CODE) may be placed on the outside of the network node. The label may comprise registration information encrypted as cipher text, encrypted with a public key. The registration information encrypted as cipher text may comprise a MAC address associated with the network node, a serial number of the network node, and a hash (e.g., signature) of the firmware of the network node. After the node is installed in the field (e.g., on street furniture such as a lamp post or building) but before it is ignited (e.g., activated), the network node may be registered with the multi-hop wireless network. Registration of a network node may comprise the following the following steps. The matrix barcode on the outside of the network node may be scanned, and a scan of the matrix barcode containing cipher text may be sent to a network management system (NMS). The NMS may already have a private key stored in its database that corresponds to the public key used to encrypt the cipher text. The NMS may use the private key to decrypt the cipher text and extract the registration information (e.g., MAC address, serial number, firmware hash) of the network node. The NMS may store this information in a table in its database. At this point, the network node may be considered to be registered with the multi-hop wireless network. At another point in time (e.g., weeks or months after registration), a particular network node may need to be ignited so that it can begin operating on the network. The NMS may initiate the ignition process by sending a message to the registered network node (e.g., via the MAC address of the network node). The message may request that the registered network node send identifying information to the NMS. The identifying information may comprise the network node's firmware hash, serial number, or any other suitable information. In response to the message, the network node may send the requested identifying information to the NMS. The messages between the network node and the NMS may be encrypted by a routing keypair. The NMS may compare the identifying information with the registration information that was previously stored in a table in the database of the NWS. If the comparison reveals that the identifying information matches the relevant registration information stored in the table, the NMS may permit the network node to join the multi-hop wireless network. If the identifying information does not match any registration information stored in the table, the NMS may consider the network node to be an unauthorized node, and it may prohibit the network node from joining the multi-hop wireless network.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
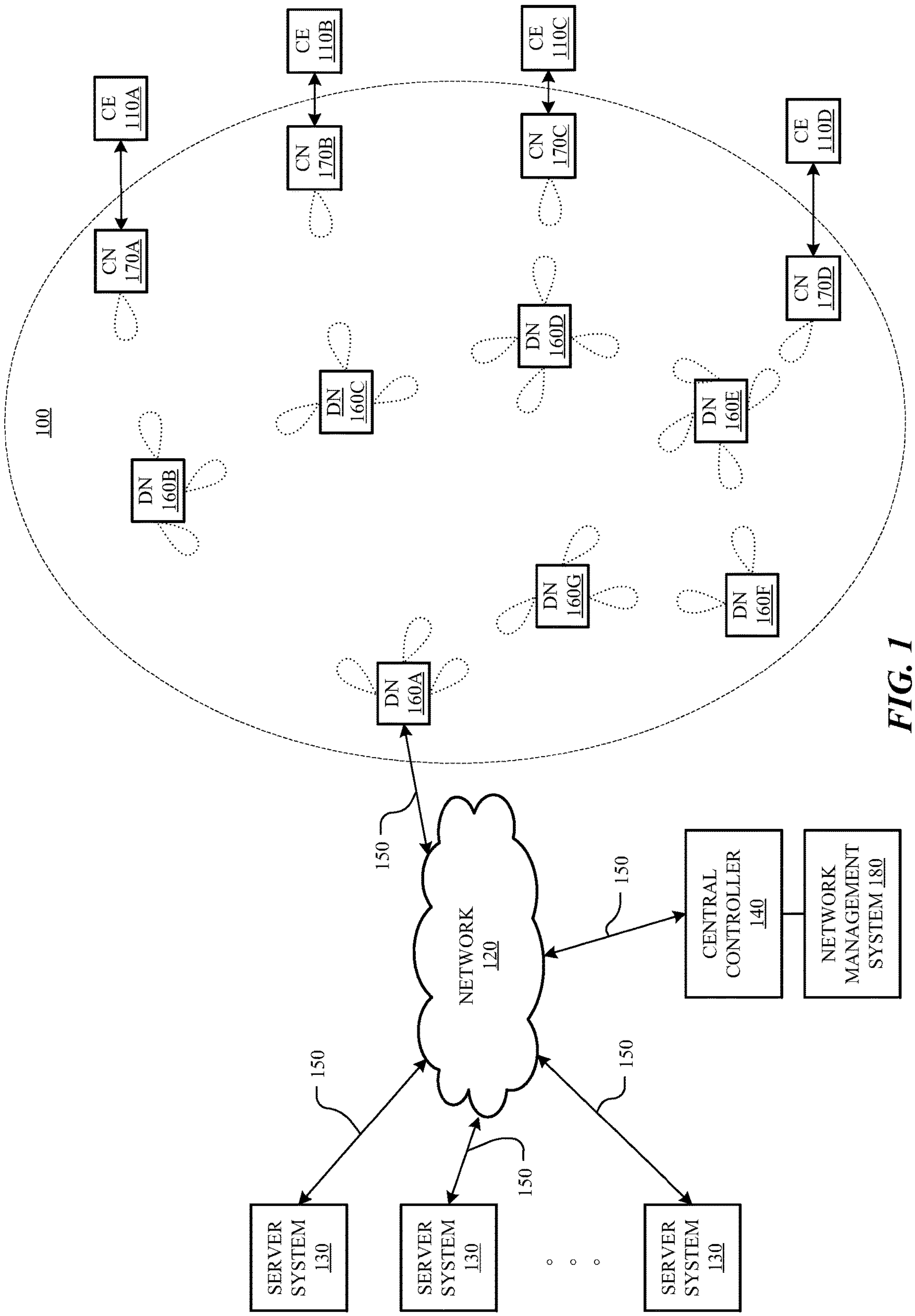
FIG. 1 illustrates an example multi-hop wireless network.

FIG. 1 illustrates an example multi-hop wireless network 100. In the example of FIG. 1, multi-hop wireless network 100 connects CE 110 at customer premises (such as residences or places of businesses) to a core or backbone network 120 (which may include one or more portions of the Internet). Network 120 connects multi-hop wireless network 100 to one or more server systems 130. Network 120 may also connect central controller 140 to multi-hop wireless network 100. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Links 150 may connect multi-hop wireless network 100, server systems 130, and central controller 140 to network 110. This disclosure contemplates any suitable links 150 for these connections. For example, one or more links 150 may include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links, where appropriate. In particular embodiments, one or more links 150 may each include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the PSTN, a 2G, 3G, or 4G mobile-telecommunications network, a satellite communications network, another link 150, or a combination of two or more such links 150, where appropriate. Links 150 are not necessarily the same throughout the network environment of FIG. 1. One link 150 may differ from another in one or more respects. Although the example of FIG. 1 is described and illustrated with a particular network environment including a particular number of particular systems and components arranged in a particular manner, this disclosure contemplates any suitable network environment including any suitable number of any suitable systems and components arranged in any suitable manner. For example, two or more of multi-hop wireless network 100, server systems 130, or central controller 140 may be connected to each other directly, bypassing network 120. As another example, two or more of multi-hop wireless network 100, server systems 130, or central controller 140 may be physically or logically co-located with each other in whole or in part.

A server system 130 may provide services (such as web services) to client and other devices and systems. For example, a server system 130 may include one or more web servers, news servers, mail servers, message servers, advertising servers, file servers, application servers, exchange servers, database servers, proxy servers, other suitable servers, or a suitable combination thereof. A server system 130 may include hardware, software, or embedded logic components or a combination of two or more such components for carrying out the functions implemented or supported by server system 130. In addition, a server system 130 may include one or more servers and be a unitary server system or a distributed server system spanning multiple computer systems or multiple datacenters. Although this disclosure describes and illustrates particular server systems, this disclosure contemplates any suitable server systems.

Central controller 140 may act as a central controller for multi-hop wireless network 100, which may include coordinating ignition of DNs 160 and CNs 170, as described below. In particular embodiments, central controller 140 may be instructed by a network management system (NMS) 180. NMS 180 may be a web application that may be used to administer the multi-hop wireless network 100. NMS 180 may instruct central controller 140. As an example and not by way of limitation, NMS 180 may instruct central controller 140 to ignite one or more network nodes on multi-hop wireless network 100. Central controller 140 may include hardware, software, or embedded logic components or a combination of two or more such components for carrying out its functions. In addition, central controller 140 may include one or more servers and be a unitary computer system or a distributed computer system spanning multiple computer systems or multiple datacenters. Central controller 140 may be connected to multi-hop wireless network 100 by network 120. In addition or as an alternative, central controller 140 may where appropriate connect to one or more network nodes of multi-hop wireless network 100 directly, for example, through out-of-band signaling by 2G, 3G, or 4G mobile telecommunications. Communication between central controller 140 and a network node of multi-hop through network 120 may be referred to as in-band. Although this disclosure describes and illustrates a particular central controller 140, this disclosure contemplates any suitable central controller 140.

In the example of FIG. 1, multi-hop wireless network 100 includes multiple DNs 160 and CNs 170. A DN 160 wirelessly communicates with one or more CNs 170 or one or more other DNs 160 to relay data through multi-hop wireless network 100. DN 160A also communicates through a link 150 with one or more edge devices of network 120 to connect multi-hop wireless network 100 to network 120, providing a point-of-presence (PoP) for multi-hop wireless network 100 on network 120. A CN 170 communicates with one or more DNs 160 and CE 110 to connect a customer network to the multi-hop wireless network. One or more wireline or other suitable links may connect a CN 170 to CE 110. A CE 100 may be part of a customer network located for example at a customer premises and may include one or more Wi-Fi APs, cellular base stations (such as femtocells), and related equipment or other CEs providing wireless or wired connectivity to one or more client devices. A client device may be an electronic device including hardware, software, or embedded logic components or a combination of two or more such components designed to carry out particular functions implemented or supported by the client device. For example, a client device may be a desktop or laptop computer, tablet, e-book reader, GPS device, camera, mobile telephone, appliance, augmented-reality or virtual-reality device, another suitable client device, or a suitable combination thereof. This disclosure contemplates any suitable client devices.

As described above, multi-hop wireless network 100 includes multiple DNs 160 and CNs 170. Wireless communication in multi-hop wireless network 100 may be point-to-point, and DNs 160 and CNs 170 may communicate wirelessly with each other in one or more frequency bands at or around 60 GHz. A DN 160 or CN 170 may have a maximum range of approximately 1.5 kilometers, but may typically communicate with other DNs 160 or CNs within approximately 200-300 meters. All or some of DNs 160 and CNs 170 the network nodes may be at fixed locations. For example, all or some of DNs 160 and CNs 170 may be affixed to street lamps, utility poles, other street furniture, or building exteriors.

A network node of multi-hop wireless network 100 may include one or more antenna arrays that are each capable of beamforming to direct signal transmission or reception by network node. A single antenna array capable of beamforming may be referred to as a sector. If a network node has multiple sectors, they will likely face different directions. For example, a network node affixed to a street pole could have four separate antenna arrays on it, with one facing north, one facing east, one facing south, and one facing west. To aim a sector for transmission or reception, the beamforming weight of the antenna array constituting the sector may be adjusted. A micro-route is a gross reflection or line of site between two sectors. A nano-route is a fine reflection or line of site between two sectors. Typically, a micro-route between two sectors has several possible nano-routes. Some of those nano-routes will provide better link capacity between the two sectors, and some of those nano-routes will interfere more with neighboring nodes. In the example of FIG. 1, the directions of the sectors of DNs 160 and CNs 170 for transmission and reception are shown as lobes with dashed lines. Each of these lobes represents a sector's main lobe (e.g. the direction of the greatest transmission power or reception sensitivity). A sector may also have side lobes and nulls, which are not shown in FIG. 1. In the example of FIG. 1, DN 160A has sectors aimed at DN 160B, DN 160D, and DN 160G; DN 160B has sectors aimed at DN 160A, DN 160C, and CN 170A; DN 160C has sectors aimed at DN 160B, DN 160D, and CN 170B; DN 160D has sectors aimed at DN 160A, DN 160C, DN 160E, and CN 170C; DN 160E has sectors aimed at DN 160D, DN 160F, DN 160G, and CN 170D; DN 160F has sectors aimed at DN 160E and DN 160G; DN 160G has sectors aimed at DN 160A, DN 160E, and DN 160F; CN 170A has a sector aimed at DN 160B; CN 170B has a sector aimed at DN 160C; CN 170C has a sector aimed at DN 160D; and CN 170D has a sector aimed at DN 160E. As described below, the sectors of DNs 160 and CNs 170 may be dynamically re-directed by changing the beamforming weights of the respective antenna arrays. Moreover, as further described below, the sectors of particular DNs 160 and CNs 170 may be dynamically re-directed in response to particular events. Although this disclosure describes and illustrates a particular example multi-hop wireless network with a particular number of particular network nodes in a particular arrangement with particular numbers of particular beamforming antenna arrays aimed in particular directions, this disclosure contemplates any suitable multi-hop wireless network with any suitable number of any suitable network nodes in any suitable arrangement with any suitable numbers of any suitable beamforming antenna arrays aimed in any suitable directions.

To improve communication paths between network nodes, to reduce interference, and to increase the throughput of the network, DNs 16 and CNs 170 may include multiple antennas composing one or more antenna arrays that may be used to control the transmit and receive directions of the node by employing beamforming techniques, as described above. Beamforming may be used to point an antenna array at a target to reduce interference and improve communication quality. In beamforming, both the amplitude and phase of each antenna may be controlled. Combined amplitude and phase control may be used to adjust the transmit and receive signals on network nodes. As will be appreciated by those skilled in the art of radio frequency communications, the radio frequency signals transmitted by each of the antennas or antenna arrays can be selectively timed by beamforming techniques to direct the main lobe (which can comprise the bulk of the transmitted signal power) in a desired direction. Similarly, signals received by the antennas can be delayed and summed using beamforming techniques to change the effective listening direction of the receiver. In the example of FIG. 1, network nodes can beamform their transmit and receive signals in several different directions, as well as other directions. Beamform training involves a transmitting network node and a receiving network node. The transmitting network node transmits training packets in each of a number of possible transmitting directions and the receiving network node listens to determine the transmission direction with which it can best detect the transmitted packets.

In particular embodiments, network nodes of multi-hop wireless network 100 may need to be added to multi-hop wireless network 100 in response to, for example, a need for expanded coverage or an increase in signal strength, or to replace defective or malfunctioning network nodes. Current network nodes on a multi-hop wireless network do not have built-in security features, like a trusted platform module (TPM). A TPM is a specialized chip on an endpoint device that stores encryption keys specific to the host system for hardware authentication. Installing a TPM on every network node in multi-hop wireless network 100 may be prohibitively expensive. Current designs leave network nodes at-risk for unauthorized actors (e.g., hackers) to break into the multi-hop wireless network 100. An unauthorized actor may install an unauthorized network node among the authorized network nodes. The unauthorized actor may then register the unauthorized network node on multi-hop wireless network 100 by copying an identifier (e.g., MAC address) of an existing authorized network node and using the identifier to pose as an authorized network node when requesting to join the network. Because the unauthorized network node used an authorized identifier, the unauthorized node may have been allowed to join the network. The unauthorized node may then have been used for malicious purposes (e.g., eavesdropping). There may not be an efficient way way to determine whether a network node is legitimate or not.

In particular embodiments, a network node may join the multi-hop wireless network in a secure manner. Joining the multi-hop network may be accomplished in two stages: registration and ignition. Prior to registration, a label comprising a matrix barcode (e.g., QR CODE) may be placed on the outside of the network node. The label may comprise registration information encrypted as cipher text, encrypted with a public key. In particular embodiments, the encryption may be accomplished with public-key encryption. Public-key encryption may refer to any cryptographic system that uses pairs of keys: public keys that may be disseminated widely (e.g., used to create the encrypted information on the label of each network node); and private keys that may be known to only a few parties (e.g., the NMS). Public-key cryptography may have two purposes: (1) authentication, in which a key pair is used to verify the sender of a message; and (2) encryption, in which only the holder of the paired private key (e.g., the NMS) may decrypt a message encrypted with the public key. In particular embodiments, the registration information encrypted as cipher text may comprise a MAC address associated with the network node, a serial number of the network node, and a hash (e.g., signature) of the firmware of the network node. After the node is installed in the field (e.g., on street furniture such as a lamp post or building) but before it is ignited (e.g., activated), the network node may be registered with the multi-hop wireless network. Registration of a network node may comprise the following the following steps. The matrix barcode on the outside of the network node may be scanned, and a scan of the matrix barcode containing cipher text may be sent to a network management system (NMS). The NMS may already have a private key stored in its database that corresponds to the public key used to encrypt the cipher text. The NMS may use the private key to decrypt the cipher text and extract the registration information (e.g., MAC address, serial number, firmware hash) of the network node. The NMS may store this information in a table in its database. At this point, the network node may be considered to be registered with the multi-hop wireless network.

At another point in time (e.g., weeks or months after registration), a particular network node may need to be ignited so that it can begin operating on the network. The NMS may initiate the ignition process by sending a message to the registered network node (e.g., via the MAC address of the network node). The message may request that the registered network node send identifying information to the NMS. The identifying information may comprise the network node's firmware hash, serial number, or any other suitable information. In response to the message, the network node may send the requested identifying information to the NMS. The messages between the network node and the NMS may be encrypted by a routing keypair. The NMS may compare the identifying information with the registration information that was previously stored in a table in the database of the NWS. If the comparison reveals that the identifying information matches the relevant registration information stored in the table, the NMS may permit the network node to join the multi-hop wireless network. If the identifying information does not match any registration information stored in the table, the NMS may consider the network node to be an unauthorized node, and it may prohibit the network node from joining the multi-hop wireless network.

Figure 2:
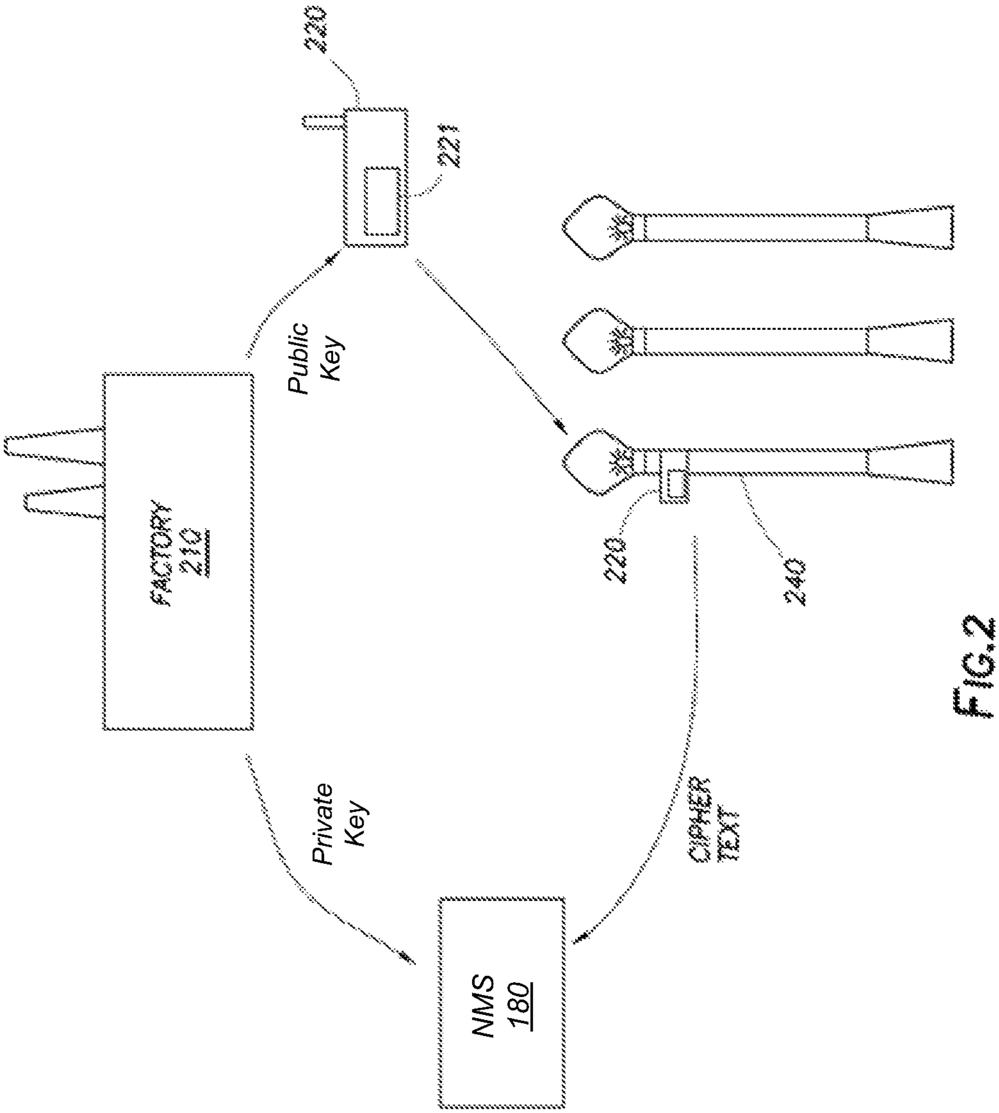
FIG. 2 illustrates an example environment for securely registering and igniting nodes on a multi-hop wireless network.

FIG. 2 illustrates an example environment for securely registering and igniting nodes on a multi-hop wireless network. The example environment may include factory 210, network node 220, label 221, outdoor structure 240, and NMS 180. Network node 220 may be manufactured at factory 210. At factory 210, network node 220 may be manufactured with label 221. Alternatively, label 221 may be placed on network node 220 after network node 220 has been manufactured. Label 221 may comprise a bar matrix (e.g., QR CODE), which in turn may comprise registration information. The registration information may include a unique identifier (e.g., media access control address (MAC address)), a hash (e.g., signature) of the firmware of the network node, which may be referred to as "firmware hash," and a serial number associated with network node 220. The registration information may be encrypted as cipher text. The term "cipher text" may be understood to mean plain text that has been encrypted. After network node 220 is manufactured and label 221 is placed on it, network node 220 may be installed within range of other network nodes on multi-hop network 100. Network node 220 may be installed on any suitable outdoor structure 240. Although outdoor structure 240 is illustrated as a light post in FIG. 2, outdoor structure 240 may be any suitable outdoor structure, such as a building, a telephone pole, a statue or monument, or a natural structure such as a tree. At the time of installation or at some other point in time (e.g., before or after installation), label 221 may be scanned by a portable computing device equipped with a camera. As an example and not by way of limitation, the portable computing device may be a smart phone operated by an administrator of multi-hop wireless network 100, who captures label 221 and wirelessly transmits the scan of label 221 to NMS 180. Alternatively, an application installed on the portable computing device may extract the cipher text comprised in label 221, and the cipher text may be wirelessly transmitted to NMS 180. Using a private key that is part of the cryptographic keypair that was used to encrypt the registration information, NMS 180 may decrypt the cipher text. Decryption may convert the cipher text to plain text that comprises the registration information. NMS 180 may then store the registration information in a lookup table on a database associated with NMS 180. As an example and not by way of limitation, the lookup table may organize the registration information for five network nodes in the manner illustrated in the table below. When the registration information has been recorded in a database associated with NMS 180, the network node associated with that registration information may be considered to be registered with multi-hop wireless network 100. Although this disclosure describes registering a network node on a multi-hop wireless network in a particular manner, this disclosure contemplates registering a network node on a multi-hop wireless network in any suitable manner.

TABLE 1

Example Lookup Table for Registered Network Nodes

| No. | MAC Address | Serial Number | Firmware Hash |
|---|---|---|---|
| 1 | 0031:25FF:FE12:3456 | 7E4786GFL586 | 44e2578965ad1a |
| 2 | 0025:63ABCC11:5387 | 5A1286OEL421 | 25f1254796ba9c |
| 3 | 0005:42BE:AC32:1D57 | 2G3278BEN653 | 36a49654782nm7h |
| 4 | 0012:AB34:4786:AA26 | 6P56714PLS785 | 41b3657821qw5n |
| 5 | 0098:96FF:AB11:0045 | 9Q3971IEN899 | 89d2846573da2p |

Figure 3:
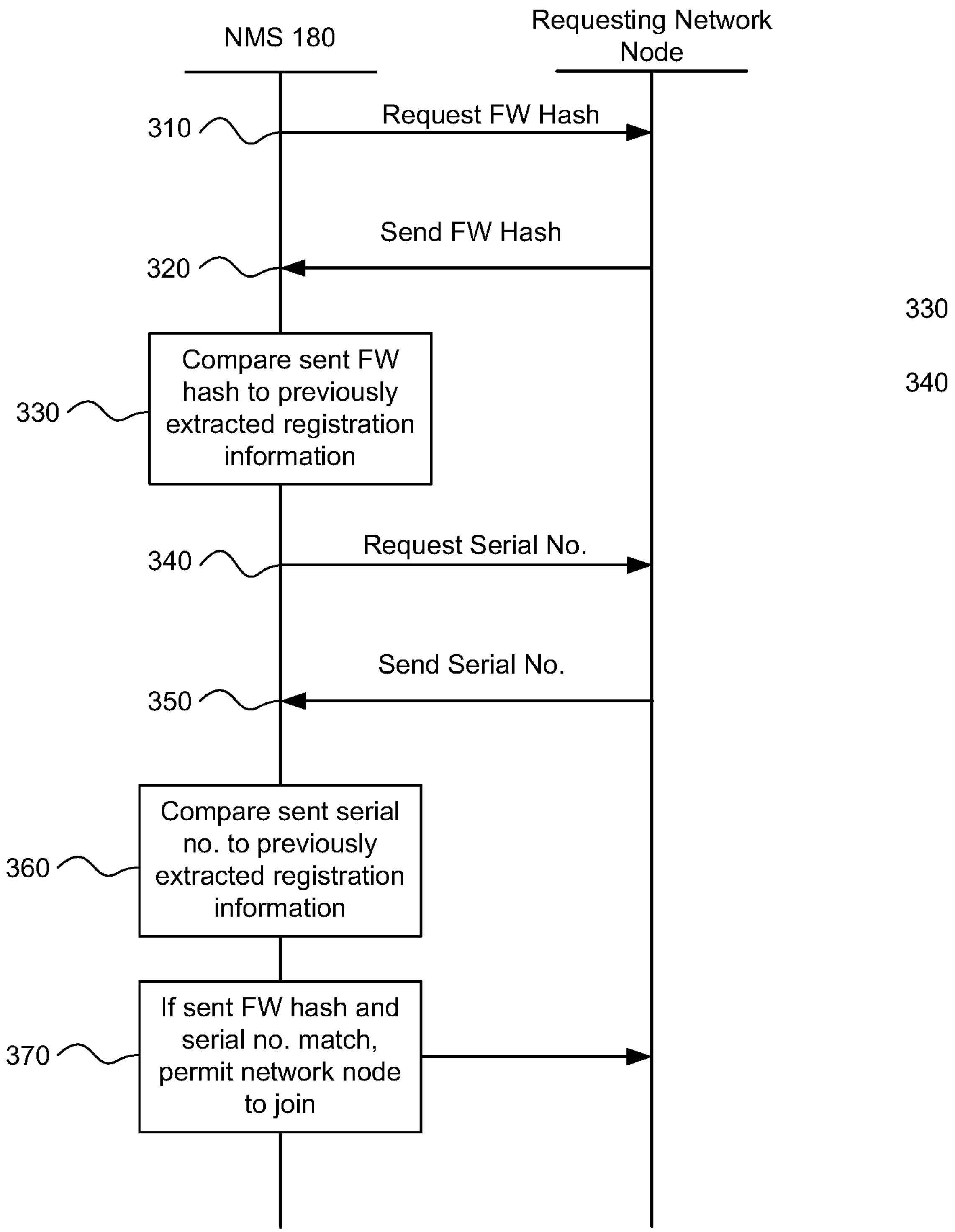
FIG. 3 illustrates an example interaction diagram between an example network node and an example network management system.

In particular embodiments, NMS 180 may initiate an ignition sequence among one or more registered but unignited network nodes 220. NMS 180 may need to ensure that it only ignites network nodes that have previously been registered with multi-hop wireless network 100. This may prevent unauthorized nodes from joining the network and may also prevent eavesdropping or other malicious actions by hackers. To do this, NMS 180 may send a message to a particular unignited network node. To send the message, NMS 180 may use a MAC address stored in its database. This concept is illustrated in the example interaction diagram of FIG. 3. At step 310, NMS 180 may request identifying information (e.g., the firmware hash) from a network node 220. As an example and not by way of limitation, NMS 180 may determine to register node 1 in the Example lookup table (Table 1). It may send a message to the network node with MAC address 0031:25FF:FE12:3456. The message may request particular identifying information from the network node (e.g., the firmware hash or serial number). Although this disclosure describes requesting information from an unignited network node in a particular manner, this disclosure contemplates requesting information from an unignited network node in any suitable manner.

In particular embodiments, in response to the message, network node 220 may send to NMS 180 the requested identifying information (e.g., the firmware hash or serial number). This is illustrated at step 320, in which the network node sends its firmware hash to NMS 180. In particular embodiments, a requesting network node may request to join multi-hop wireless network 100 even if NMS 180 does not send an initial message requesting identifying information from network node 220. In either scenario, when a network node sends its identifying information to NMS 180 it may be considered to be a requesting network node. In particular embodiments, NMS 180 may receive from a requesting network node identifying information. As an example and not by way of limitation, either in response to the message sent by NMS 180 or on its own accord, a requesting network node may send its firmware hash to NMS 180. As an example and not by way of limitation, the firmware hash may be 44e2578965ad1a. Although this disclosure describes sending particular identifying information to an NMS in a particular manner, this disclosure contemplates sending any suitable identifying information to an NMS in any suitable manner.

In particular embodiments, NMS 180 may access, in a data store associated with the NMS, registration information of a plurality of previously registered network nodes of the multi-hop wireless network. The registration information may be stored in a lookup table. The registration information may include one or more of a firmware hash that was assigned to the previously registered network node when it was manufactured (or, in particular embodiments, after it was manufactured), or a serial number of the previously registered network node that was assigned to the previously registered network node when it was manufactured (or, in particular embodiments, after it was manufactured). The registration information may have been extracted from the previously registered network node and communicated to NMS 180 as cipher text encoded with a public key, as explained above. The registration information may have further been decoded at NMS 180 with a private key corresponding to the public key, as explained above. As an example and not by way of limitation, the registration information of five previously registered network nodes may be stored in a lookup table similar to that of Table 1. Although this disclosure describes accessing registration information in a particular manner, this disclosure contemplates accessing registration information in any suitable manner.

In particular embodiments, NMS 180 may compare the identifying information of the requesting network node with the registration information of the previously registered network nodes of multi-hop wireless network 100 to determine whether the requesting network node is determined to be one of the previously registered network nodes. This is illustrated at step 330, in which NMS 180 compares the sent firmware hash from the requesting network node with the entries of firmware hashes stored in the database. As an example and not by way of limitation, NMS 180 may receive the firmware hash 44e2578965ad1a and determine that it matches one of the firmware hash corresponding to network node 1 in Table 1. As another example and not by way of limitation, NMS 180 may receive the firmware hash 59n327846ad1b and determine that it does not match any firmware hash stored in the lookup table (e.g., Table 1). If the firmware hash matches, NMS may, as an extra layer of authentication, proceed to step 340 and request the serial number of the requesting network node. In response, at step 350, the requesting network node may send its serial number to NMS 180. As an example and not by way of limitation, NMS 180 may receive the serial number 7E4786GFL586 and, at step 360, compare the received serial number to the entries of serial numbers stored in the database. As an example and not by way of limitation, NMS 180 may compare the received serial number 7E4786GFL586 to the five serial numbers listed in Table 1 and determine that it matches the serial number corresponding to network node 1 in Table 1. As another example and not by way of limitation, NMS 180 may receive the firmware hash 8D47852KDN325 and determine that it does not match any serial number stored in the lookup table (e.g., Table 1), or NMS 180 may determine that the received serial number does match the serial number of a network node in the lookup table, but not the same network node for the firmware hash. If this is the case, NMS 180 may determine that the requesting network node is not a previously registered network node, because both the firmware hash and the serial number may need to match the same network node in the lookup table for the requesting network node to be deemed to be a previously registered network node, and thus be permitted to join multi-hop wireless network 100. Although this disclosure describes comparing identifying information in a particular manner, this disclosure contemplates comparing identifying information in any suitable manner.

In particular embodiments, at step 370, if the identifying information matches the relevant registration information in the lookup table, NMS 180 may consider the requesting network node to be one of the previously registered network nodes, and it may permit the requesting network node to join multi-hop wireless network 100. In particular embodiments, if the identifying information does not match the registration information in the lookup table, NMS 180 may determine that the requesting network node is not one of the previously registered network nodes. In this case, NMS 180 may ignore future messages from the requesting network node. Although this disclosure describes permitting a network node to join a network in a particular manner, this disclosure contemplates permitting a network node to join a network in any suitable manner.

In particular embodiments, permitting the requesting network node to join the multi-hop wireless network comprises igniting the requesting network node. Igniting the requesting network node may include establishing a wireless connection between an antenna array of the requesting network node and an antenna array of another network node already operating on the multi-hop wireless network. In particular embodiments, network ignition may involve using information and data that has been predetermined and loaded either directly onto a memory store in the network nodes themselves or on a central controller or other suitable computing device. The information and data may include settings regarding beamforming weights for one or more antenna arrays in each of the network nodes. The information and data may also include Global Positioning System (GPS) data, orientations of the network nodes and other information that may be useful in igniting the nodes. However, information about adjustments to make to beamforming weights, orientations, and other setting may be unavailable to the network nodes. This may inhibit the network nodes' ability to achieve a wireless connection with another network node in an efficient manner. When no such information is available, the network nodes may need to adjust the beamforming weights on their antenna arrays to scan or sweep the surrounding area for an other network node to establish a wireless connection. Once a wireless connection has been established, it may be assumed that the network nodes with wireless connections are operating in the steady state. During steady state operation, information and statistics about the operation of the network nodes may be recorded. Such information and statistics may include beamforming weights adjustments, GPS locations and orientation of one or more network nodes, and other information relating to how wireless connections are established between network nodes. Although this disclosure describes igniting a network node in a particular manner, this disclosure contemplates igniting a network node in any suitable manner.

Figure 4:
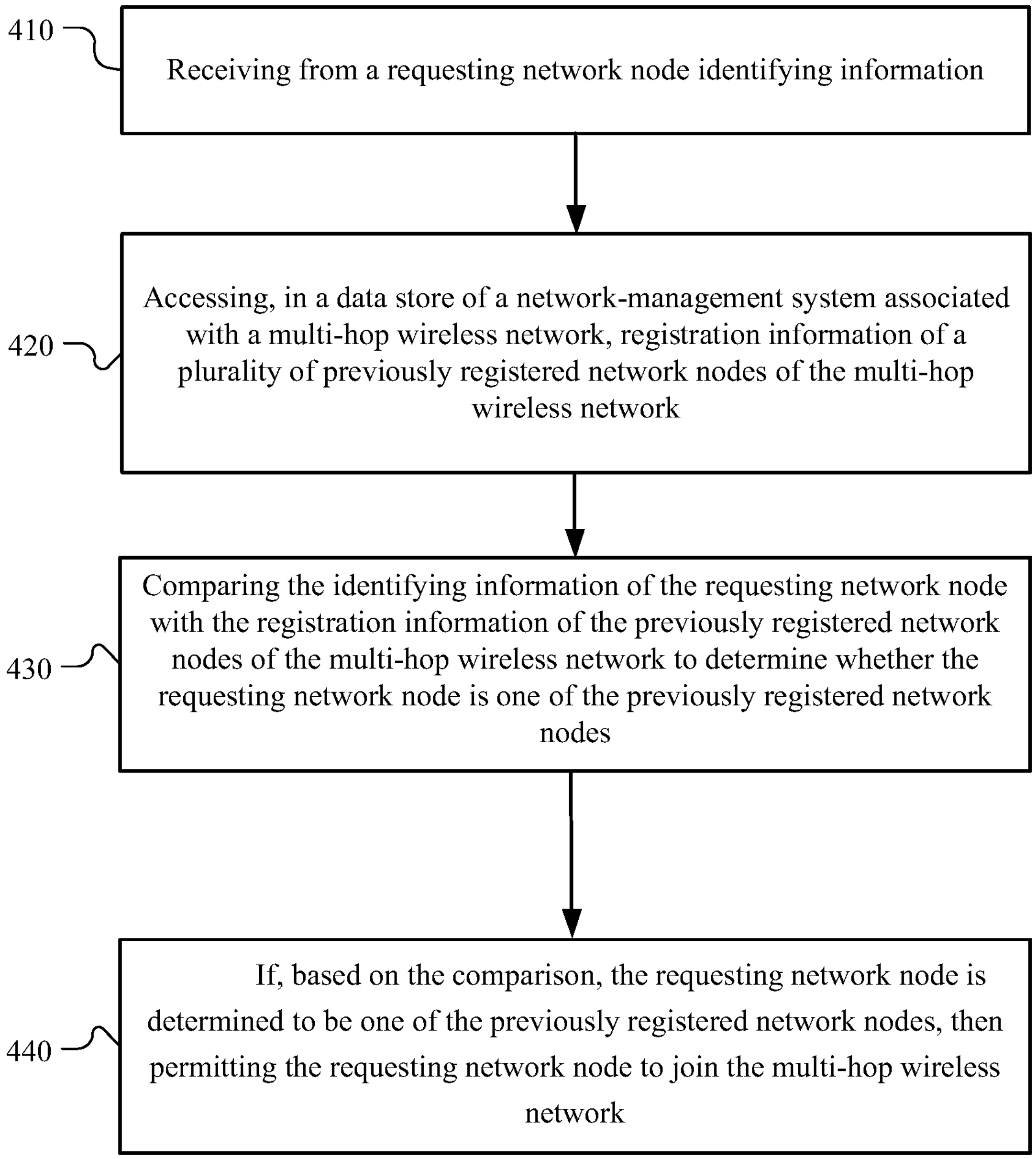
FIG. 4 illustrates an example method for securely registering and igniting network nodes in a multi-hop wireless network.

FIG. 4 illustrates an example method for securely registering and igniting network nodes in a multi-hop wireless network. At step 410, NMS 180 may receive from a requesting network node identifying information (e.g., firmware hash, serial number) associated with the requesting network node. At step 420, NMS 180 may access, in a data store of a network-management system associated with a multi-hop wireless network, registration information of a plurality of previously registered network nodes of multi-hop wireless network 100. The registration information may comprise a firmware hash that was assigned to the previously registered network node when it was manufactured, or a serial number of the previously registered network node that was assigned to the previously registered network node when it was manufactured. The registration information may have been, in connection with installation of the previously registered network node: (1) extracted from the previously registered network node and communicated to the network-management system as cipher text encoded with a public key; and (2) decoded at the network-management system with a private key corresponding to the public key. At step 430, NMS 180 may compare the identifying information of the requesting network node with the registration information of the previously registered network nodes of the multi-hop wireless network to determine whether the requesting network node is one of the previously registered network nodes. This may involve one or two cycles of accessing and comparing identifying information. As an example and not by way of limitation, NMS 180 may compare only the firmware hash of the requesting network node with the registration information. Alternatively, NMS 180 may compare both the firmware hash and the serial number of the requesting network node with the registration information. At step 440, if based on the comparison, the requesting network node is determined to be one of the previously registered network nodes, NMS 180 may permit the requesting network node to join the multi-hop wireless network. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for securely registering and igniting network nodes in a multi-hop wireless network including the particular steps of the method of FIG. 4, this disclosure contemplates any suitable method for securely registering and igniting network nodes in a multi-hop wireless network including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
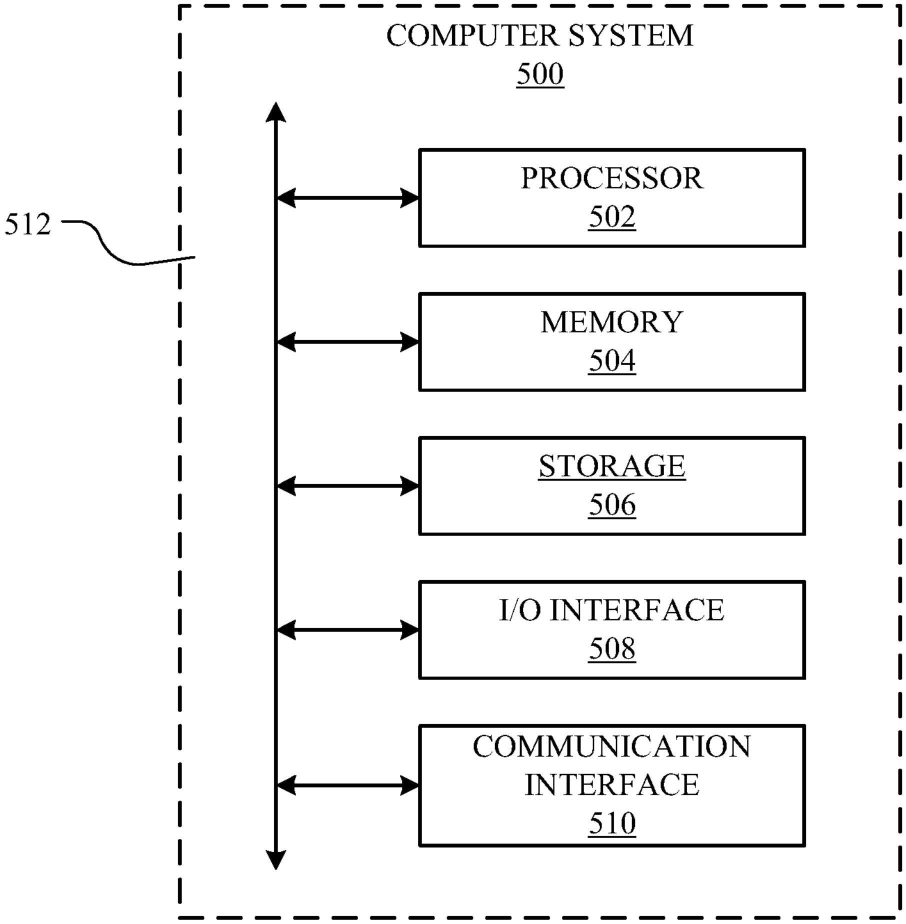
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a network node of a multi-hop wireless network:

receiving, at the network node from a network management system associated with the multi-hop wireless network, a request for identifying information associated with the network node; and sending, responsive to the request for identifying information, from the network node to the network management system, registration information associated with the network node, wherein the registration information comprises cipher text encoded with a public key, wherein the encoded cipher text is configured to be decoded with a private key, and wherein the encoded cipher text comprises a MAC address and an identifier assigned to the network node.

2. The method of claim 1, wherein the identifier assigned to the network node comprises one or more of a firmware hash or a serial number assigned to the network node when the network node was manufactured.

3. The method of claim 1, wherein the registration information is embedded in a matrix barcode displayed on an outer surface of the network node.

4. The method of claim 3, wherein the matrix barcode is configured to be scanned by a camera of a portable computing device.

5. The method of claim 4, wherein the network node is configured to send the registration information to the network management system via the portable computing device.

6. The method of claim 1, further comprising:

sending, from the network node to the network management system, a request by the network node to join the multi-hop wireless network, wherein the request for identifying information is received in response to the request by the network node to join the multi-hop wireless network.

7. The method of claim 6, wherein the request by the network node to join the multi-hop wireless network is associated with an installation of the network node.

8. The method of claim 6, wherein the request by the network node to join the multi-hop wireless network is associated with an ignition of a plurality of network nodes of the multi-hop wireless network.

9. The method of claim 1, wherein the network node was previously authorized to join the multi-hop wireless network, and wherein the request for identifying information is received in response to a request by the network node to rejoin the multi-hop wireless network.

10. The method of claim 9, wherein the request by the network node to rejoin the multi-hop wireless network is associated with one or more of a power outage, a software update, or an instruction to perform a power cycle.

11. The method of claim 1, wherein the registration information sent to the network management system is configured to be recorded in a lookup table of the network management system if the network node is authorized to join the multi-hop wireless network.

12. The method of claim 1, further comprising:

receiving, at the network node from the network management system, an authorization to join the multi-hop wireless network; and establishing, by the network node, responsive to receiving the authorization to join the multi-hop wireless network, one or more wireless connections with one or more respective other network nodes of the multi-hop wireless network based on network ignition information associated with the network node.

13. The method of claim 12, wherein the network node comprises one or more sectors that each comprise an array of beamforming antennae, and wherein each of the one or more wireless connections is established by adjusting an array of the network node based on the network ignition information associated with the network node.

14. The method of claim 12, wherein the network ignition information associated with the network node comprises information related to one or more of Global Positioning System (GPS) data, physical location, physical orientation, beamforming weight, signal frequency, signal phase shift, or a time division multiplexing scheme.

15. The method of claim 12, wherein the network ignition information associated with the network node is based on operational settings of the network node recorded during a period of steady-state operation of the network node.

16. The method of claim 12, wherein the network ignition information associated with the network node is received from the network management system.

17. The method of claim 12, wherein the network ignition information associated with the network node is retrieved from a data store of the network node.

18. The method of claim 1, further comprising:

receiving, from the network management system, an authorization to join the multi-hop wireless network;

determining, by the network node, that network ignition information associated with the network node is unavailable; and establishing, by the network node, responsive to determining that network ignition information associated with the network node is unavailable, one or more wireless connections with one or more respective other network nodes of the multi-hop wireless network by scanning an area surrounding the network node.

19. One or more computer-readable non-transitory storage media embodying software that is operable when executed to:

receive, at a network node of a multi-hop wireless network, from a network management system associated with the multi-hop wireless network, a request for identifying information associated with the network node; and send, responsive to the request for identifying information, from the network node to the network management system, registration information associated with the network node, wherein the registration information comprises cipher text encoded with a public key, wherein the encoded cipher text is configured to be decoded with a private key, and wherein the encoded cipher text comprises a MAC address and an identifier assigned to the network node.

20. A network node of a multi-hop wireless network, wherein the network node comprises: one or more processors; and a memory coupled to the processors comprising instructions executable by the processors, the processors being operable when executing the instructions to:

receive, at the network node of the multi-hop wireless network, from a network management system associated with the multi-hop wireless network, a request for identifying information associated with the network node; and send, responsive to the request for identifying information, from the network node to the network management system, registration information associated with the network node, wherein the registration information comprises cipher text encoded with a public key, wherein the encoded cipher text is configured to be decoded with a private key, and wherein the encoded cipher text comprises a MAC address and an identifier assigned to the network node.

* * * * *